May 1, 1951  A. SPEER  2,551,065
CABLE CLAMP
Filed Jan. 17, 1947  3 Sheets-Sheet 2
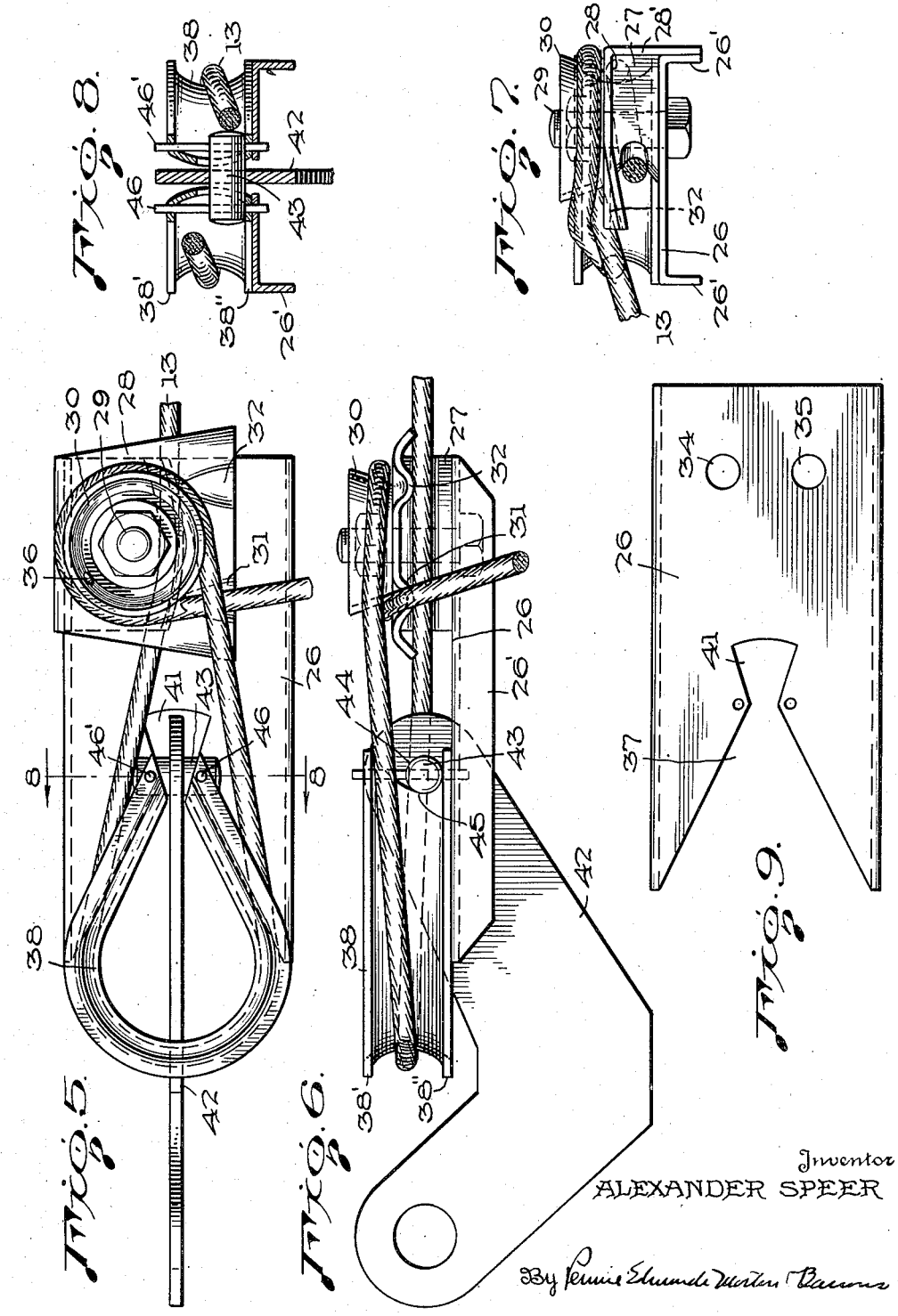
Inventor
ALEXANDER SPEER May 1, 1951 A. SPEER 2,551,065
CABLE CLAMP
Filed Jan. 17, 1947 3 Sheets-Sheet 3
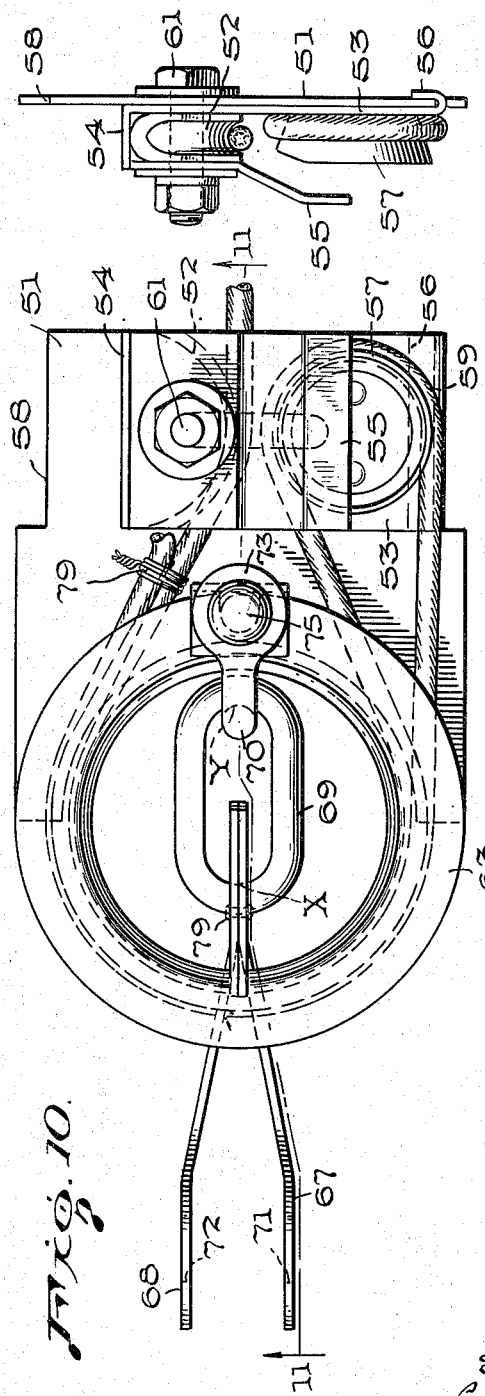
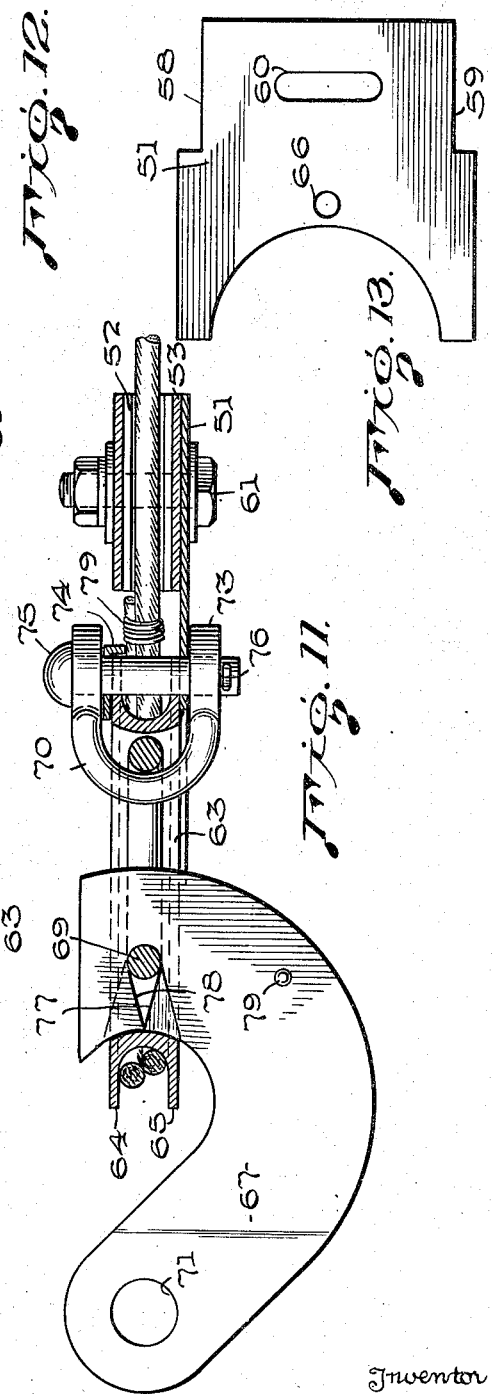
Inventor
ALEXANDER SPEER
By
Attorneys Patented May 1, 1951

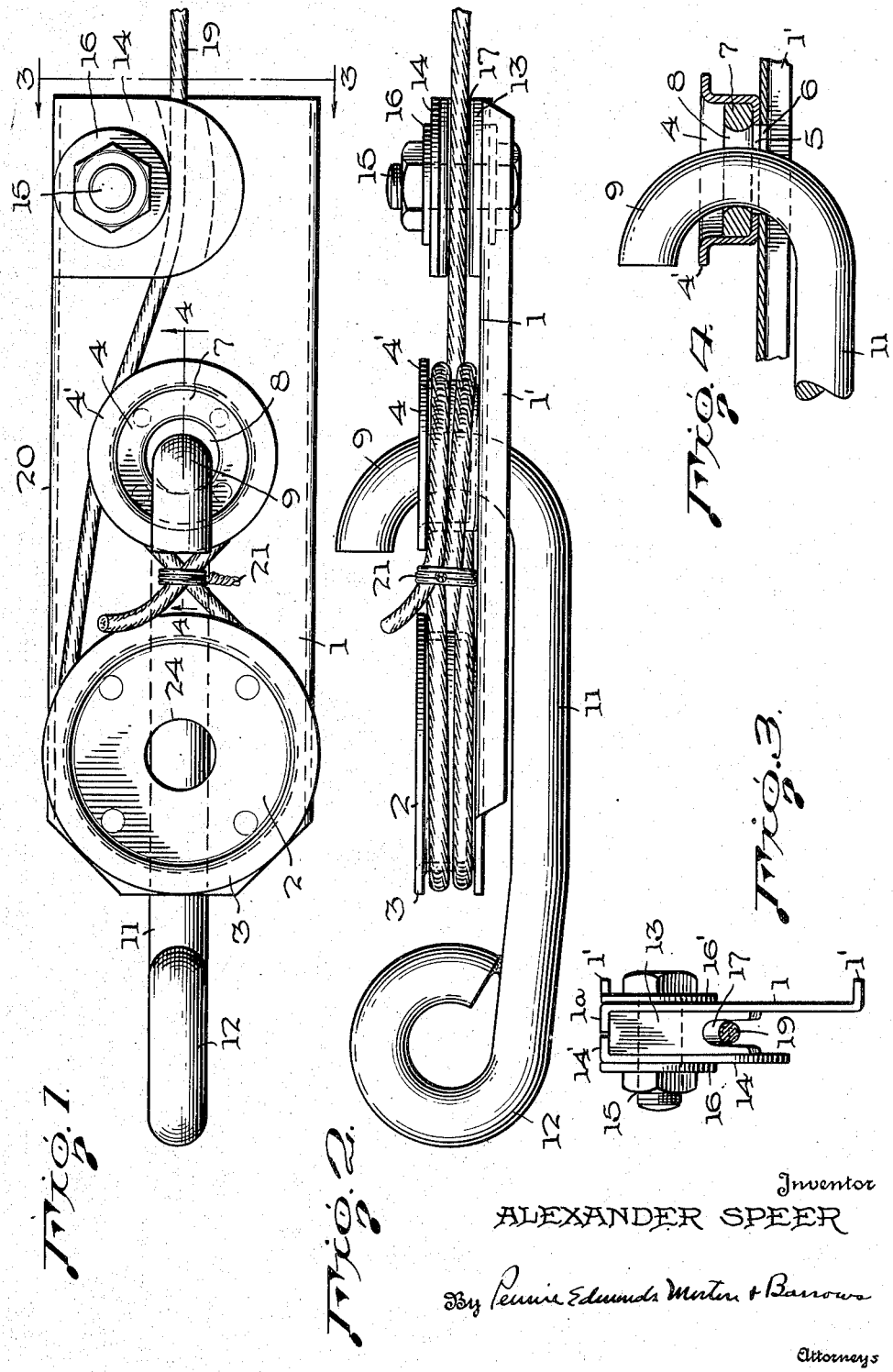

2,551,065

UNITED STATES PATENT OFFICE 2,551,065

CABLE CLAMP

Alexander Speer, St. Petersburg, Fla.

Application January 17, 1947, Serial No. 722,522

13 Claims. (Cl. 24—115)

1

This invention relates to an improved cable clamp for use in association with power lines for the conduction of electrical energy, and to such a clamp which will avoid the continual bending and hammering of the cable due to the vibration of the line, and will avoid the crystallization and fatigue which usually occur in cables as a result of such bending and hammering thereof at the point at which it comes in first contact with the clamp.

Cable clamps and dead end supports in the past have been constructed in such a manner that it was not uncommon for the cable to fail at its junction with the clamp because of the continual bending and crushing of the cable at this point. In order to eliminate this fatigue from bending and damaging from hammering it has been proposed to use a seat in the clamp made of a material softer than the cable to decrease the damage to the cable at its point of support on the clamp. However, the difference between the oscillation of the suspended cable and the natural period of oscillation of the clamp causes a relative movement between the cable and the clamp with the resultant bending and weakening of the cable at a point where the cable makes its first contact with the clamp.

The primary object of the present invention is to provide a cable clamp with its weight so distributed on either side of its support and has substantially no natural period of vibration, thus providing a form of double pendulum construction. With a clamp of such double pendulum construction used to secure a cable, the clamp will assume substantially the same period of oscillation as the cable since it has no natural frequency at which it tends to oscillate. Since the clamp will move with the cable as it vibrates, there will be no continual bending of the cable at the point where it makes first contact with the clamp and resultant damage thereto.

More specifically the invention contemplates cable clamp which is so pivotally supported that it may oscillate substantially about its center of oscillation, with the support being such that there will be free pivotal movement of the body of the clamp with respect to the supporting member. The support may be secured in turn to an insulator, depending upon the electrical requirement of the system.

The invention further contemplates a terminal guide or saddle of special construction in conjunction with the self-binding action of the cable obtained by winding the cable on projections formed on the body of the clamp. This

2 saddle is made or lined with any soft materials such as wood, lead, babbitt, hard rubber, or certain plastics, or the material may have embodied in it a lubricant such as graphite or ground mica so that the portion of the saddle which is in contact with the cable is made of a material appreciably softer than the cable. What tangential or rocking movement of the cable that may occur on such a saddle will result in the wear occurring on the softer surface, or on the softer lubricated surface of the saddle, rather than on the surface of the cable.

The invention will be further described in connection with the accompanying drawing in which:

Fig. 1 is a plan view of a cable clamp constructed in accordance with the present invention, Fig. 2 is a side elevational view of the clamp of Fig. 1, Fig. 3 is a transverse sectional view of the cable clamp taken on line 3—3 of Fig. 1.

Fig. 4 is a cross-sectional view on line 4—4 of Fig. 1,

Fig. 5 is a plan view of a modified form of the cable clamp of the present invention, Fig. 6 is a side elevational view of the form of clamp shown in Fig. 5, Fig. 7 is an end view of the clamp of Fig. 5, Fig. 8 is a cross-sectional view partly in elevation on line 8—8 of Fig. 5, Fig. 9 is a plan view of the stamping which forms the base of the cable clamp.

Fig. 10 is a plan view of another modified form of the cable clamp of the present invention, Fig. 11 is a cross-sectional view of the form of clamp shown in Fig. 10, taken on line 11—11 of Fig. 10.

Fig. 12 is an end view of the clamp of Fig. 10, and

Fig. 13 is a plan view of the stamping which forms the base of the cable clamp of Fig. 10.

Referring now to the drawings, and first to the form of the invention shown in Figs. 1 to 4, I designates the frame or base of the cable clamp which has reinforcing or strengthening flanges 1' extending along the longitudinal edges at one side thereof. A cylindrical winding cup or guide 2 having an outwardly-extending flange 3 at the upper edge thereof is secured to the base 1 near one end thereof, preferably by spot welding. A second flanged cylindrical winding cup or guide 4 having an outwardly-extending flange 4' and having a centrally-positioned opening or hole 5 in the bottom thereof is secured to the base so that the hole 5 is directly above and aligned with a hole 6 formed in the base at approximately the center thereof. A bearing ring 7, of steel or other hard, wear-resisting material, is inserted and secured flush with the bottom of the winding cup or guide 4 so that the axis of the bearing ring 7 is coincident with the axis of the aligned holes 5 and 6. The bearing ring 7 has a central passage or hole 8 of a diameter slightly smaller than holes 5 or 6 so that the inner periphery thereof will take the wear caused by the pivotal movement of the cable clamp on a hook portion 9 of a supporting member 11 formed from round stock. The hole 8 has a diameter which is larger than the diameter of the round stock formed into hook 9 which permits not only free pivotal movement in the plane of base 1 but also permits movement to a more limited extent in a plane transverse to the plane of the base 1, thereby effecting a limited universal movement of the cable clamp around the supporting member 11. A closed loop 12 is formed at the other end of the supporting member 11 so that it may be secured to an insulator, pole or other structure, depending on the requirements of the system.

The annular passage formed by the holes 5, 6 and 8 is so positioned that the axis thereof substantially passes through the center of gravity of the base 1 and the parts of the clamp carried thereby so that the weight of the clamp is substantially balanced around the annular passage.

A saddle or terminal guide 13 is fastened to the base near the end thereof opposite that to which the winding up or guide 2 is secured. A portion 1a of the strengthening flange 1' at one side of the base 1 is bent up to meet a flanged edge 14' of a plate 14, which, together with said flanges and the base plate 1 forms a recess in which the saddle 13 is secured by a nut and bolt 15 and washers 16 and 16'. This assembly allows the replacement of saddle 13 when it becomes worn.

The inner edge face of the saddle 13 is convex in the longitudinal direction of the clamp, as shown in Fig. 1, with the convex surface being formed on a relatively long radius. The convex surface of the saddle has a groove 17 formed therein, in which the cable is received and has limited movement when the cable is secured to the clamp as hereinafter described.

The saddle 13 is made of a material softer than the cable 19 to be clamped or snubbed, such as wood, lead, babbitt, hard rubber, or certain plastics, and, if desired, may have a lubricant such as graphite or powdered mica incorporated therein. By forming the saddle 13 of relatively soft material the surface of the cable 19 will not be appreciably worn and consequently weakened as a result of relative movement between the cable 19 and the saddle 13, such as occurs when vibrations are set up in the cable which cause a slight oscillation of the base plate 1 about the hooked end portion 9 of the supporting member 11 as a pivot.

The cable 19 may be secured to the clamp by winding it around the winding cups or guides 2 and 4, in any desired manner. For example, the cable 19 after being led over the groove 17 in the saddle 13 may be passed over and partially along the edge of the winding cup or guide 4 nearest the longitudinal edge 20 adjacent which the saddle 13 is secured. It then may be passed around the winding cup or guide 2 in a clockwise direction, then back around the winding cup or guide 4 in an anticlockwise direction, then once around the winding cup or guide 2 in a clockwise direction, after which it may be passed around the winding cup or guide 4 in a clockwise direction, and the free end secured by a tie wire 21, or otherwise, to the crossed portions of the cable between the winding cups or guides 2 and 4, as shown in Figs. 1 and 2, to prevent the cable from slipping from its wound position.

A hole or opening 24 extends through the base of winding reel or cup 2 for the purpose of draining the cavity thereof.

From the foregoing it will be apparent that in a cable clamp constructed as described, its weight is substantially evenly distributed about a point of pivotal support, so that the clamp acts as a balanced compound pendulum which has no natural period of oscillation, and, consequently, will oscillate about its center of oscillation. Since the cable clamp is constructed so that it may move pivotally in two planes at angles to one another, and since the cable clamp has no natural period of vibration, it can adapt itself to vibrations in the cable by moving with the anchored end of the cable as the cable vibrates, resulting in a minimum of retarding force on, and bending of said anchored end of the cable. By avoiding any sharp bending of the cable and rubbing of the cable against hard surfaces, the clamp minimizes wear and fatigue in the cable and the consequent failure thereof.

A modification of the form of clamp shown in Figs. 1 to 5 is shown in Figs. 5 to 9, in which a base plate 26 having longitudinal-extending reinforcing edge flanges 26' is stamped into substantially the shape shown in Fig. 9. A saddle 27, of the same material and form as saddle 13 of Figs. 1 to 5, is secured to the upper face of the base 26 near one edge and end thereof by an overlying clamping plate 28. The clamping plate 28 has a downwardly-extending flange 28' extending beyond the saddle 27 and of such length as to be coextensive with the flange 26' at that end of the base plate, against which it lies. Thus the clamping plate 28 and its flange 28', together with the base plate 26 forms a recess into which the saddle 27 is received. The saddle 27 is secured in said recess by a nut and bolt 29. A cup having an upwardly diverging outer wall is secured to the top of the clamping plate 28 by the bolt 29. The diameter of the cup or guide 30 is such as to permit the clamping plate 28 to form a floor extending from an around the bottom periphery of the cup or guide 30.

The clamping plate 28 is formed with two tapered indentations 31 and 32 in that edge portion thereof which overhangs the saddle 27. The tapered indentations 31 and 32 taper outwardly and downwardly for a purpose hereinafter described.

The base 26 is formed with two holes 34 and 35 through which the saddle-securing bolt 29 may pass in order to permit the saddle 27 to be mounted on either side of the base 26 for a purpose hereinafter described.

A hole 36 is formed in the side of cup 30 to allow drainage thereof.

The end of the base plate 26 opposite that to which the saddle 27 is secured is cut away to form a generally triangular, inwardly-converging recess 37. A generally pear-shaped thimble or cable guide 38 of skeletal form, and having outwardly-extending flanges 38' and 38'' at its top and bottom edges, is secured to the upper surface of the base plate by welding or otherwise securing the straight portions of the lower flange 38″ to the edges of the base plate defining the recess 37.

As shown in Fig. 9, the base plate 26 has a longitudinally-extending recess 41 formed therein at the apex of the triangular recess 37. The recess 41 communicates with the recess 37 and forms an extension thereof.

The base plate 26 and the parts of the clamp secured thereto are pivotally connected for vertical swinging movement to a supporting finger 42 by means of a pivot pin 43.

The finger 42 is inserted upwardly through the communicating recesses 37 and 41 of the base 26 and between the spaced inner ends of the pear-shaped guide or thimble 38. The pivot pin 43 extends through a hole 44 in the inserted end of the finger 42, and bears against rounded surfaces 45 of the ends of the pear-shaped guide or thimble. Drive-fit pins 46 and 46′ pass through holes near the ends of the pear-shaped guide 38, the pivot pin 43, and the base plate 26 and prevent axial movement of the pivot pin 43 and the subsequent freeing of the cable clamp from its supporting finger 42. The finger 42 may be anchored on an insulator, pole or other structure, depending on requirements of the system.

As in the first form of this cable clamp, the pivot pin 43 is so positioned on the base that the weight of the base 26 and its assembled parts is distributed in substantially the same proportion on either side of the pivot pin axis. The recesses 37 and 41 allow a free movement, within limits, of the base 26 and its assembled parts around the pivot pin 43.

In anchoring the cable 13 to the clamp, it is led over the saddle 27, around the pear-shaped guide 37, up and around the cup or guide 30, and then is led out under itself so that the slack end of the cable 13 lies in the indentation 31 in the clamping member 28, as shown in Figs. 5 and 6.

The holes 34 and 35 in the base 26 permit the saddle 27 to be mounted on either side of the base 26 so that the slack end of the cable 13 may be led out on either side of the cable clamp; the cable lies in indentation 31 when the saddle is mounted using hole 34 and then lies in indentation 32 when the saddle is mounted using hole 35.

In this form of the invention, as in the first form, the cable clamp is pivotally mounted on its support so that the weight of the clamp is distributed substantially evenly around this pivoted support. The clamp is in the form of a double pendulum, and in consequence of the substantially even distribution of weight at opposite sides of the pivot pin 43, the clamp will have no natural frequency of oscillation. This will allow the clamp to vibrate at any frequency set up in the cable. That, together with the saddle construction will result in less sharp bending and wear of the cable and resultant weakening thereof.

An additional modification of the form of clamp shown in Figs. 1 to 5 is shown in Figs. 10 to 13, in which a base plate 51 carries a saddle 52 on the vapor face thereof in a recess formed by a saddle-carrying plate 53, a flange 54 extending upwardly from saddle-carrying plate 53, and a guard 55. The saddle 52 is of the same material and form as the saddles 13 and 27 of the preceding forms of the invention.

The saddle-carrying plate 53 has its end opposite to the upwardly-extending flange 54 bent to form a sharp U-shaped hook 56 whose spread is only slightly wider than the thickness of the base plate 51. The upper face of the saddle-carrying plate 53 has a spool 57 or the like mounted thereon near the edge thereof which is bent to form the U-shaped hook 56. The spool 57 has sides which diverge outwardly from the saddle-carrying plate 53.

As shown in Fig. 12, the guard 55 is formed so that two parallel portions are joined by an oblique portion. The guard 55 extends from the flange 54 to cover the saddle 52, and then is bent away from the saddle-carrying plate 56 by the oblique portion so that a further extension of the guard 55 lies over and is spaced from the spool 57, partially covering it, but with sufficient clearance to permit the application of the conductor to the saddle 52.

The end of the base plate 51 on which the saddle-carrying plate 53 is mounted has its width reduced by rectangular cuts 58 and 59 the length of which are substantially the same as the width of the saddle-carrying plate 53. The base plate 51 has a transversely-extending slot 60 formed in this reduced end centrally between the side edges thereof. A nut and bolt 61 with suitable washers secure the saddle-carrying plate 53 and its assembled parts to the base plate by the bolt passing through openings in the saddle-carrying plate, the saddle 52, the guard 55 and the slot 60. The length of the slot 60 is sufficient to allow the U-shaped hook of the saddle-carrying plate 53 to engage either edge of the base plate 51 when the nut is in the corresponding extreme position of the slot 60. To reverse the relative position of the saddle 52 and the winding spool 57 on the base plate 51, the nut and bolt 61 are loosened, the bolt moved in the slot 60 to disengage the U-shaped hook 56 from the edge of the base plate 51 and to allow the carrying plate 53 to be pivoted around the nut in a half circle about the end of the base plate 51 so that the U-shaped hook 56 will then be adjacent the other edge thereof. The nut may then be moved further into the slot 60 until the U hook 56 engages this edge of the base plate 51.

The base plate 51 is formed with a semi-circular recess on the end thereof opposite that end to which the saddle-carrying plate 53 and its assembled parts are secured. An annular winding guide 63, substantially U-shape in cross-section and having outwardly-extending flanges 64 and 65 at its top and bottom, is held to the upper portion of the base plate 51 by welding or otherwise securing the lower flange 65 to the edge of the base plate 51 defining the semi-circular recess. An opening 66 is formed approximately on the lengthwise center line of the base plate 51 adjacent the semi-circular recess. Openings formed in the flanges 64 and 65 of the winding guide 63 are aligned with the opening 66 in the base plate 51.

The clamp is supported by supporting members 67 and 68 which may be secured to an insulator or any other supporting structure. The supporting members 67 and 68 pivotally hold a closed link 69 which in turn pivotally engages a clevis link 70, passing therethrough. The closed link 69 in its assembled position in the central opening of the winding guide 63 lies flat substantially in a plane bisecting the height or thickness of the winding guide 63. Openings 71 and 72 formed in the outer extremities of the supporting members 67 and 68 are adapted to secure the clamp to the supporting structure. The centers of the openings 71 and 72 normally lie in substantially the same plane as the closed link 69.

The clevis link 70 has flattened flared ends 73 with openings therethrough of substantially the same dimensions as the openings 66 in the base plate 51. The clevis link 70 is positioned so that the curved base portion thereof lies in the opening of the winding guide 63 and the openings through the flared ends 73 are aligned with the opening 66 in the base plate 51 and the openings through the flanges 64 and 65 of the winding guide 63. A strengthening and wear plate 74 formed with a hole therethrough is inserted between the upper flange 64 of the winding guide 63 and the adjacent flared end 73 of the clevis link 70. A clevis pin 75 passes through the aligned openings of the clevis link, the plate, the flanges 64 and 65 of the winding guide 63 and the opening 66 of the base plate 51 to secure the clevis link 70 and to allow pivoted movement thereof. The wear plate 74 will take up the wear caused by such pivotal movement and not allow the clevis link 70 to become cocked from its true position. The clevis pin 75 is locked in place with a cotter pin 76.

The supporting member 67 is formed with an upwardly and outwardly-extending slot 77 having a semi-circular terminal edge in that portion thereof which extends into the central opening of the winding guide 63. The semi-circular terminal edge has substantially the same radius as the cross-section of the link 69. The supporting member 68 is symmetrical in plane with the supporting member 67 and has a downwardly and outwardly-extending slot 78 which has a semi-circular terminal edge in that portion thereof which corresponds to the terminal edge of the slot 77 in the supporting member 67. The radius of the semi-circular terminal edge of the slot 78 is the same as that of the semi-circular terminal edge of slot 77. When the portions of the supporting members 67 and 68 that extend through the central openings of the winding guide 63 are placed against one another, slots 77 and 78 form a closed opening in the combined structure in which the link 69 is secured. The supporting members 67 and 68 are held together by a rivet or cotter 79 for convenience in handling until the clamp is being installed, after which it serves no purpose.

The cable may be secured to the cable clamp by passing it between the guard 55 and spool 57 and onto the groove in the convex edge of the saddle 52, around the winding guide 63, around the winding spool 57, under the guard 55, then back around the winding guide 63, and then tied or bound by a tie wire or the like, as at 79.

It will be apparent that the cable clamp is supported from at least two freely pivotal points, one at X, where the supporting members 67 and 68 hold the link 69, and the other at Y, where the link 69 engages the base of the clevis link 70. This form of cable clamp is so designed that after the cable is secured, as above described, the center of oscillation of the assembly will be somewhere between and substantially on a line joining the points X and Y. Therefore, when the cable vibrates and imparts a vibrating movement to the cable clamp, the clamp will automatically seek and oscillate around its true resultant center of oscillation. This will allow the clamp to vibrate in any plane and at any frequency set up in the cable which together with the saddle construction will result in less sharp bending and wear of the cable and resultant weakening thereof.

I claim:

1. A cable clamp assembly comprising a base plate, a member on said base plate, a cable wound about said member and held against displacement with respect thereto, and means for supporting said assembly for substantially universal oscillation about a point at approximately the center of oscillation of the assembly.

2. A cable clamp assembly comprising a base plate, a member on said base plate, a cable wound about said member and held against displacement with respect thereto, a saddle on said base plate against which the cable bears and with respect to which the cable may have relative motion as the cable vibrates, and means for supporting said assembly intermediate the saddle and the member about which the cable is wound and held against displacement for oscillation substantially in the plane of the base plate about a point at approximately the center of oscillation of the assembly.

3. A cable clamp assembly comprising a base plate, a member on said base plate, a cable wound about said member and held against displacement with respect thereto, a saddle on said base plate against which the cable bears and with respect to which the cable may have relative motion as the cable vibrates, and means for supporting said assembly intermediate the saddle and the member about which the cable is wound and held against displacement for substantially universal movement about a point at approximately the center of oscillation of the assembly.

4. A cable clamp assembly as set forth in claim 3 in which the saddle has a grooved convex face which receives the cable.

5. A cable clamp assembly as set forth in claim 4 in which that portion of the saddle against which the cable bears and with respect to which it may have relative movement is softer than the cable.

6. A cable clamp assembly comprising a base plate, a member carried by said base plate adjacent one end thereof, a cable extending about said member and held against displacement with respect thereto, supporting means for the clamp, a link pivotally supported at one end from said supporting means and inwardly from the outer end of the member about which the cable extends, and means connecting the remote end of said link for pivotal movement with respect to the base plate, the center of oscillation of said assembly lying intermediate the ends of said link, whereby upon vibration of the cable the assembly automatically will oscillate substantially about its center of oscillation.

7. A cable clamp comprising a base plate, a winding guide carried by the base plate adjacent one end thereof, a second winding guide carried by the base plate adjacent the other end thereof, a link having one end thereof pivotally connected to the base plate intermediate said winding guides, lengthwise of the base plate, the other end of said link terminating inwardly from the outer part of said first winding guide, and supporting means for the clamp having a pivotal connection to said other end of the link.

8. A cable clamp comprising a base plate, a winding guide carried by the base plate adjacent one end thereof, a second winding guide carried by the base plate adjacent the other end thereof, a saddle carried by the base plate at said other end thereof against which a cable is adapted to bear and with respect to which the cable may have relative motion on vibration of the cable, a link having one end thereof pivotally connected to the base plate intermediate said winding guides, lengthwise of the base plate, the other end of said link terminating inwardly from the outer part of said first winding guide, and supporting means for the clamp having a pivotal connection to said other end of the link.

9. A cable clamp comprising a base plate, a winding guide carried by the base plate adjacent one end thereof, a saddle against which a cable is adapted to bear carried by the base plate adjacent the other end thereof, and a second winding guide carried by the base plate intermediate said first winding guide and the saddle, lengthwise of the base plate, said second winding guide and the base plate having aligned openings at substantially the center of oscillation of the clamp to receive a member for pivotally supporting the clamp.

10. A cable clamp as set forth in claim 9 in which the saddle has a grooved convex face to receive the cable which is of material softer than the cable.

11. A cable clamp comprising a base plate, a winding guide having outwardly-extending flanges supported by the base plate adjacent one end thereof, a second winding guide supported by the base plate intermediate the length thereof, said second winding guide and said base plate having aligned openings at substantially the center of oscillation of the clamp, a lining insert of hard material for at least a part of the opening in said second winding guide against which a supporting member is adapted to bear for pivotally supporting the clamp, and a saddle carried by the base plate adjacent the other end thereof, said saddle having a grooved convex face to receive a cable.

12. A cable clamp comprising a base plate, a saddle in which the cable may lie and with respect to which the cable may move as the cable vibrates, a winding spool, a mounting plate secured to one end of the base plate and carrying said saddle and said winding spool, said mounting plate's secured position on said base plate being reversible so that the position of said saddle and said winding spool may be interchanged, a winding guide having an open center portion secured to the other end of said base plate, said winding spool and said winding guide being adapted to have a cable wound about them and held against displacement, supporting means for the cable clamp, a link pivotally supported by said supporting means, and a clevis pivotally secured to said clamp, said link being pivotally connected to said clevis, the center of gravity of the cable clamp being substantially between the points of pivotal connection between said link and said supporting means and between said link and said clevis, said points lying within the open central portion of said winding guide.

13. A cable clamp comprising a base plate, a saddle in which the cable may lie and with respect to which the cable may move as the cable vibrates, a winding spool, a mounting plate secured to one end of the base plate and carrying said saddle and said winding spool, said mounting plate's secured position on said base plate being reversible so that the portion of said saddle and said winding spool may be interchanged, a winding guide having an open center portion secured to the other end of said base plate, said winding spool and said winding guide being adapted to have a cable wound about them and held against displacement, supporting means for said clamp comprising two members each having a portion adapted to lie against the other, said portions extending through the open center of the winding guide, one of said portions having a downwardly extending slot from that edge thereof which is opposite to the direction in which the cable will pull, the other of said portions having an upwardly-extending slot from its corresponding edge, said slots being positioned and of such a form that when said portions lie against each other said slots will form a closed opening, a link pivotally supported by said supporting means and passing through said closed opening, and a clevis pivotally secured to said clamp, said link being pivotally connected to said clevis, the center of gravity of the cable clamp being substantially between the points of pivotal connection between said link and said supporting means and between said link and said clevis, said points lying within the open central portion of said winding guide.

ALEXANDER SPEER.

REFERENCES CITED

The following references are of record in the file of this patent:

UNITED STATES PATENTS

| Number | Name | Date |
|---|---|---|
| 417,180 | Harvey | Dec. 10, 1889 |
| 533,402 | Trester | Jan. 29, 1895 |
| 1,184,891 | Sunderland | May 30, 1916 |
| 1,832,138 | Pounder | Nov. 17, 1931 |
| 1,884,037 | Malone | Oct. 25, 1932 |
| 2,132,319 | Preiswerk | Oct. 4, 1938 |
| 2,252,018 | McHugh | Aug. 12, 1941 |
| 2,255,961 | Becker | Sept. 16, 1941 |
| 2,390,538 | Jessen | Dec. 11, 1945 |

OTHER REFERENCES

"Overcoming Vibration in Transmission Cables"; G. H. Stockbridge, Electrical World, vol. 86, No. 26, December 26, 1925, 2 pages.

"Vibration of Overhead Line Conductors"; by E. W. W. Double and W. D. Tuck, Institution of Electrical Engineers (London) Journal vol. 86, pgs. 129–150, February 1940 (Discussion 150–160) Bibliography. Dead End Clamp Illustrated, pages 140–146.